(12) United States Patent
Ohr et al.

(10) Patent No.: US 7,831,788 B1
(45) Date of Patent: **\*Nov. 9, 2010**

(54) SYSTEM AND METHOD USING LOCKS FOR PROVIDING SAFE MOVEMENT OF DATA USING THIRD PARTY COPY TECHNIQUES

(75) Inventors: James P. Ohr, St. Paul, MN (US); Thomas W. Lanzatella, Minneapolis, MN (US)

(73) Assignee: Symantec Operating Corporation, Mountain View, CA (US)

( \* ) Notice: Subject to any disclaimer, the term of this patent is extended or adjusted under 35 U.S.C. 154(b) by 0 days.

This patent is subject to a terminal disclaimer.

(21) Appl. No.: 10/856,045

(22) Filed: May 28, 2004

Related U.S. Application Data

(63) Continuation of application No. 10/212,428, filed on Aug. 5, 2002, now Pat. No. 6,772,309, which is a continuation-in-part of application No. 09/924,228, filed on Aug. 7, 2001, now Pat. No. 6,721,851.

(51) Int. Cl.
*G06F 12/16* (2006.01)
*G06F 12/00* (2006.01)

(52) U.S. Cl. ........................ 711/162; 711/114; 711/152; 711/159; 711/163; 711/164; 711/E12.091; 711/E12.094; 711/E12.097

(58) Field of Classification Search ................. 711/112, 711/114, 133, 152, 159, 162, 163, 165, E12.091, 711/E12.094, E12.097, 2; 707/10, 202, 204; 709/203, 217, 213–214, 223, 225, 232; 710/32; 714/6

See application file for complete search history.

(56) References Cited

U.S. PATENT DOCUMENTS

| | | | | |
|---|---|---|---|---|
| 5,155,845 | A | \* | 10/1992 | Beal et al. ...................... 714/6 |
| 5,251,318 | A | \* | 10/1993 | Nitta et al. ................... 711/152 |
| 5,506,980 | A | \* | 4/1996 | Inagami et al. ............... 711/159 |
| 5,692,155 | A | | 11/1997 | Iskiyan et al. ................ 395/489 |
| 5,832,515 | A | | 11/1998 | Ledain et al. ................. 707/202 |
| 5,944,789 | A | \* | 8/1999 | Tzelnic et al. ............... 709/214 |
| 6,108,749 | A | | 8/2000 | White et al. ................. 711/112 |
| 6,173,377 | B1 | | 1/2001 | Yanai et al. .................. 711/162 |
| 6,209,070 | B1 | | 3/2001 | Reed et al. ................... 711/165 |
| RE37,601 | E | | 3/2002 | Eastridge et al. ............... 714/6 |

(Continued)

OTHER PUBLICATIONS

*Working Draft*, Project T10/1416-D, Information Technology—SCSI Primary Commands—3 (SPC-3), Revision 03, Reference No. ISO/IEC 14776-313: 200x; ANSI NCITS (American National Standards Institute, Inc). \*\*\*:200x, Jan. 10, 2002. pp. iii-xxiv & 1-330.

*Primary Examiner*—Mardochee Chery
(74) *Attorney, Agent, or Firm*—Campbell Stephenson LLP

(57) ABSTRACT

Systems, methods, apparatus and software can utilize storage resource locks to prevent modification (including relocation) of data in the storage resource while a third-party copy operation directed at the storage resource is occurring. A data transport mechanism such as a data restore application requests that a relevant portion of the storage resource be locked. Once locked, the data transport mechanism requests a data mover to perform a third-party copy operation whereby data is moved from a data source to the locked portion of the storage resource. When the third party-copy operation is complete, the data transport mechanism requests release of the lock on the portion of the storage resource.

30 Claims, 7 Drawing Sheets

U.S. PATENT DOCUMENTS

| | | | |
|---|---|---|---|
| 6,353,878 B1 | 3/2002 | Dunham | 711/162 |
| 6,363,385 B1 | 3/2002 | Kedem et al. | 707/10 |
| 6,507,853 B2 * | 1/2003 | Bamford et al. | 707/203 |
| 6,549,992 B1 | 4/2003 | Armangau et al. | 711/162 |
| 6,772,309 B1 * | 8/2004 | Ohr et al. | 711/163 |
| 6,792,557 B1 * | 9/2004 | Takamoto et al. | 714/7 |
| 6,842,833 B1 * | 1/2005 | Phillips et al. | 711/162 |
| 7,146,364 B1 * | 12/2006 | Josten et al. | 707/8 |

* cited by examiner

SYSTEM AND METHOD USING LOCKS FOR PROVIDING SAFE MOVEMENT OF DATA USING THIRD PARTY COPY TECHNIQUES

This application is a continuation of U.S. patent application Ser. No. 10/212,428, entitled "System And Method Using Locks For Providing Safe Movement Of Data Using Third Party Copy Techniques," filed Aug. 5, 2002 now U.S. Pat. No. 6,772,309, and naming James P. Ohr and Thomas W. Lanzatella as the inventors, which in turn is a continuation-in-part of U.S. application Ser. No. 09/924,228, filed Aug. 7, 2001, entitled "System and Method for Preventing Sector Slipping in a Storage Area Network," naming James Ohr as the inventor, now U.S. Pat. No. 6,721,851. The above-referenced applications are hereby incorporated by reference herein in their entirety.

FIELD OF THE INVENTION

The present invention relates to the field of data protection and more particularly to a system and method for using locks to provide safe movement of data using third party copy techniques.

BACKGROUND OF THE INVENTION

Recent developments in storage solutions have led to the increased utilization by enterprises of Storage Area Networks (SANs) to provide storage consolidation, reliability, availability, and flexibility. Factors driving these developments include the increase in the amount of on-line data, data protection requirements including efficient and reliable data back-up, and rapidly increasing disk bit densities.

FIG. 1 illustrates a simplified example of an enterprise computing system 100. Servers 110 and 120 are at the heart of computing system 100. As members of enterprise computing system 100, servers 110 and 120 are often referred to as "hosts" or "nodes," and can execute an number of different types of programs including, for example, operating systems, file systems, volume managers, and applications programs such as database systems. FIG. 6 (described below) illustrates some of the features common to servers 110 and 120 as well as client computer systems 130. Servers 110 and 120 can exchange data over network 140, typically a local area network (LAN), e.g., an enterprise-wide intranet, or a wide area network (WAN) such as the Internet. Additionally, network 140 provides a communication path for various client computer systems 130 to communicate with servers 110 and 120.

Other elements of enterprise computer system 100 include storage area network (SAN) 150, SAN switch 160, and storage devices such as tape drive 170, storage array 180, and optical drive 190. As shown in FIG. 1, both servers 110 and 120 are coupled to SAN 150. SAN 150 is conventionally a high-speed network that allows the establishment of direct connections between storage devices 170, 180, and 190 and servers 110 and 120. Thus, SAN 150 is shared between the servers and allows for the sharing of storage devices between the servers to providing greater availability and reliability of storage.

SAN switch 160, tape drive 170, storage array 180, and optical drive 190 are examples of shared resources. The most common shared resource in an enterprise computing environment is some form of shared data resource, such as one or more disk drives. Although a disk device (and various related devices such as storage array 180) is perhaps the most common example of both a shared resource and a shared data resource, a variety of other types of devices will be well known to those having ordinary skill in the art. Moreover, servers 110 and 120 can be connected to SAN 150 through SAN switch 160. Additionally, the shared resources can be directly connected to, or part of, the servers, and thus enterprise computing system 100 need not include a SAN. Alternatively, servers 110 and 120 can be connected to multiple SANs. Additionally, SAN switch 160 can be replaced with a SAN router or a SAN hub.

Protecting the integrity of data as it is moved from one part of a computing system to another is an important aspect of any computer system. Data movement can result from a variety of operations including normal application software operation, data backup operations, data restore operations, and data relocation resulting from system design changes or hardware failures. In many computing systems, data movement is handled by programs executing on servers such as servers 110 and 120. In the case of data movement operations such as data backup and data restore, the use of server resources to handle the data movement means that fewer server resources are available for more typical operations such as application software and operating system overhead. Accordingly, efforts have been taken to move some I/O processing off of system servers to an offhost agent. Such agents are often referred to as third-party copy (3PC) devices or data movers.

Third-party copy operations transfer data directly between storage devices in a SAN or other environment using a third-party copy device, copy manager, or data mover 200 such as illustrated in FIG. 2. Data mover 200 can be a separate device as shown; part of a SAN switch, router, bridge, or another SAN network component (not shown) or within a storage element such as storage array 180 in FIG. 1. As is typical of SAN environments, the connection between the servers 110 and 120 and data mover 200 is conventionally a channel protocol bus such as SCSI or fibre channel connected directly to the storage devices or storage device controllers (e.g. RAID controllers). Thus, the data mover operates on behalf of some other piece of software, e.g., a backup or restore application, to accomplish the third party copy operation.

In one example of a third party copy device, the device implements the SCSI-3 extended copy command. SCSI-3 commands are described in *SCSI Primary Commands-3 (SPC-3)*, Working Draft, Revision 03, T10, a Technical Committee of the Accredited Standards Committee of the National Committee for Information Technology Standards (NCITS), 10 Jan. 2002, which is hereby incorporated by reference herein in its entirety. The extended copy command provides a SCSI command to copy data from one set of devices to another. These devices can be disks, tapes, or other types of storage devices. This SCSI protocol command can be used on devices connected via SCSI cables or Fibre Channel connections. The data mover is the device that receives and performs the extended copy command. Another device is an intelligent device somewhere in the storage infrastructure that understands the extended copy command. This can be another server, but more likely will be a smart-storage device, such as an intelligent tape device, disk device, SAN switch or storage router. The host server typically has some extra processing to perform at first, in order to gather all the file or volume information necessary to pass along inside the extended copy command. Additionally, if either the source or destination of the extended copy is a removable media device, then the host will typically first issue other SCSI commands to get the removable device into the proper position (loading or positioning the tape). Next, the host issues the extended copy command to the data mover, telling the device to move data from one storage device directly to another storage device.

After issuing the extended copy command, no further instructions have to be issued by the host to move the data—the devices themselves perform the entire data movement operation over the SCSI bus or Fibre Channel connection.

As illustrated in FIG. 2, storage devices 210 and 220 are coupled to the SAN 150. In this example, storage devices 210 and 220 are shown as a data source and a data destination respectively (e.g., illustrating a restore operation from a tape drive to a hard disk), but such devices can typically operate as either data sources or data destinations. Alternately, source storage devices can be directly coupled to the SAN 150 through data mover 200. In still another example, data mover 200 can be included as part of a proprietary storage device, such as a storage array. Thus, data movers 200 can be implemented as independent devices, devices in traditional SAN components, or even as software executing on a SAN component, e.g., software executing on a storage device controller.

In general, data to and from storage devices is provided using either block-level or file-level access. File level access requires some knowledge of the underlying file system and/or volume management system used to organize data on the storage devices. This type of information is typically available only at the host level, and thus I/O operations utilizing file-level access must be performed or at least managed by software executing on a host computer. Block-level access uses physical storage device addresses to access data and thus need not be "assisted" by some entity having file system and/or volume knowledge. Third-party copy operations typically utilize block-level access because of the inherent speed and efficiency gained by avoiding heavy use of host resources.

Returning to the example illustrated in FIG. 2, third-party copy data transfers are initiated when an application operating on one of the servers provides the data mover 200 with the addresses of the source and destination devices and blocks. For example, a data restore application executing on server 110 can request that certain data on a tape in data source 210 be restored to a disk drive in data destination 220. Such address information is typically in the form of an extent list having one or more extents. An extent is typically a contiguous set of storage blocks allocated for a file portion, a file, or multiple files. Extents are typically represented by a device address indication, a starting block address on that device, and a length (number of contiguous blocks). However, extents can be defined in a variety of different ways, e.g., a starting address and an ending address, no device information explicitly included, etc. Thus, an extent is generally any information used to locate a desired portion of a storage resource.

For the purposes of this example, data destination 220 is a block (disk) device on which a file system or database resides and data source 210 can be any block or stream device (a serial device such as a tape drive). Once initiated, a third-party copy operation generally operates separately from any file system, volume management, or application program activity on the system servers. Thus, since the server can reorganize or write to data residing on data destination 220 asynchronously of the third-party copy operation, there is considerable risk in moving data into a live file system or database on the data destination. Potential error conditions can arise due to a reorganization and/or modification of the data destination device after an extent list initiated by a third-party copy request has been generated and sent to the data mover 200.

The potential error conditions can be referred to as "sector slipping" events and manifest themselves as two error states on the data destination device. A first sector slipping error state involves a movement of data or allocated space from the destination extents to another physical location (e.g. volume reorganization). As illustrated in FIG. 3A, disk 1 300 is organized as volume A and includes destination blocks 310 corresponding to destination extents that are to be written to by a third-party copy operation. Some time after the list of data extents has been provided to the data mover, but before the third-party copy operation has completed, an error is detected on disk 1 300 causing a volume manager to move all data for volume A from disk 1 300 to disk 2 320. Since the third-party copy operation has not yet completed and the destination blocks 310 have moved, there exists the possibility that the destination blocks 310 moved from disk 1 to disk 2 will not reflect all the data intended to be copied by the third-party copy operation. Furthermore, the data mover has no way of knowing that the reorganization is taking place and continues to move blocks into the destination blocks 310 on disk 1.

Another error state is illustrated in FIG. 3B. Disk 1 350 is partitioned into two volumes, volume A and volume B. Volume A includes destination blocks 360 corresponding to destination extents that are to be written to by a third-party copy operation. Volume B includes application data 370 that is, in general, unrelated to the data associated with destination blocks 360. Some time after the list of data extents has been provided to the data mover, but before the third-party copy operation has completed, the storage space on disk 1 is reallocated so that volume A is moved to disk 2 380 and volume B is reorganized on disk 1. In this example, the reorganization of volume B included movement of application data 370 to an area of disk 1 that includes destination blocks 360. Thus, as the data mover writes to destination blocks 360, it may be erroneously writing over valid application data.

Accordingly, it is desirable to provide safe and accurate data movement in third-party copy operations.

SUMMARY OF THE INVENTION

It has been discovered that systems, methods, apparatus and software can utilize storage resource locks to prevent modification (including relocation) of data in the storage resource while a third-party copy operation directed at the storage resource is occurring. A data transport mechanism such as a data restore application requests that a relevant portion of the storage resource be locked. Once locked, the data transport mechanism requests a data mover to perform a third-party copy operation whereby data is moved from a data source to the locked portion of the storage resource. When the third party-copy operation is complete, the data transport mechanism requests release of the lock on the portion of the storage resource.

Accordingly, one aspect of the present invention provides a method. The method includes requesting a lock on an allocated portion of a storage resource. A third-party copy operation is initiated when a lock grant indication is received. The third-party copy operation moves data from a data source to the allocated portion of the storage resource. Completion of the third-party copy operation is indicated when the third-party copy operation is complete.

In another aspect of the present invention, a system includes a data transport module and a storage resource locking module. The data transport module is configured to request a lock on a portion of a storage resource, to initiate a third-party copy operation, and to indicate completion of the third-party copy operation when the third-party copy operation is complete. The storage resource locking module is configured to receive a lock request from the data transport module and lock the portion of the storage resource. The locking module allows only the third-party copy operation to modify the portion of the storage resource when the portion of the storage resource is locked.

Still another aspect of the present invention provides an apparatus including a requesting means, an initiating means, and an indicating means. The requesting means is for requesting a lock on an allocated portion of a storage resource. The initiating means is for initiating a third-party copy operation when a lock grant indication is received. The third-party copy operation moves data from a data source to the allocated portion of the storage resource. The indicating means is for indicating completion of the third-party copy operation when the third-party copy operation is complete.

The foregoing is a summary and thus contains, by necessity, simplifications, generalizations and omissions of detail. Consequently, those skilled in the art will appreciate that the summary is illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

DETAILED DESCRIPTION

The following sets forth a detailed description of at least the best contemplated mode for carrying out the one or more devices and/or processes described herein. The description is intended to be illustrative and should not be taken to be limiting.

Figure 1:
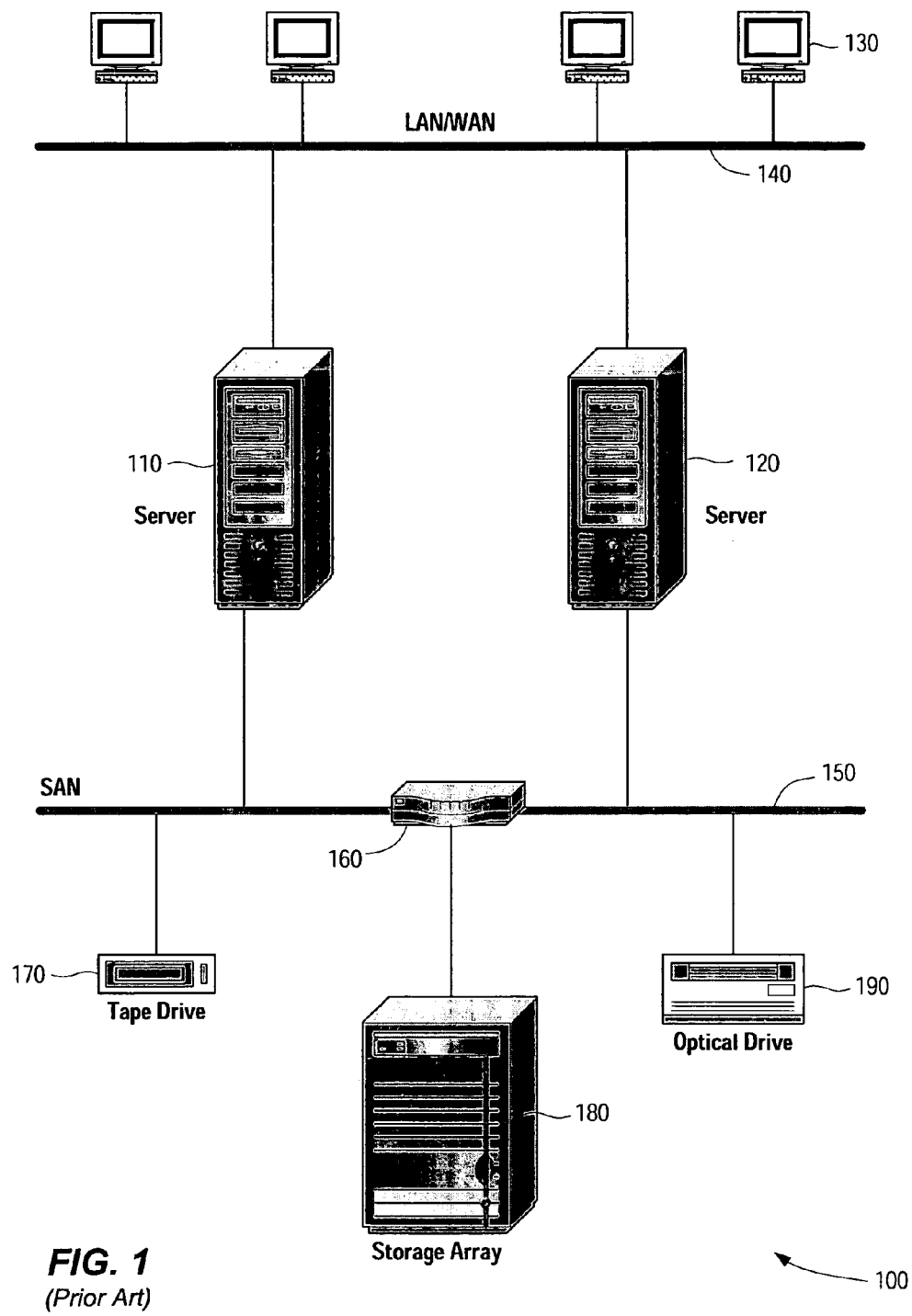
FIG. 1 is a simplified block diagram of an enterprise computer system.
Figure 2:
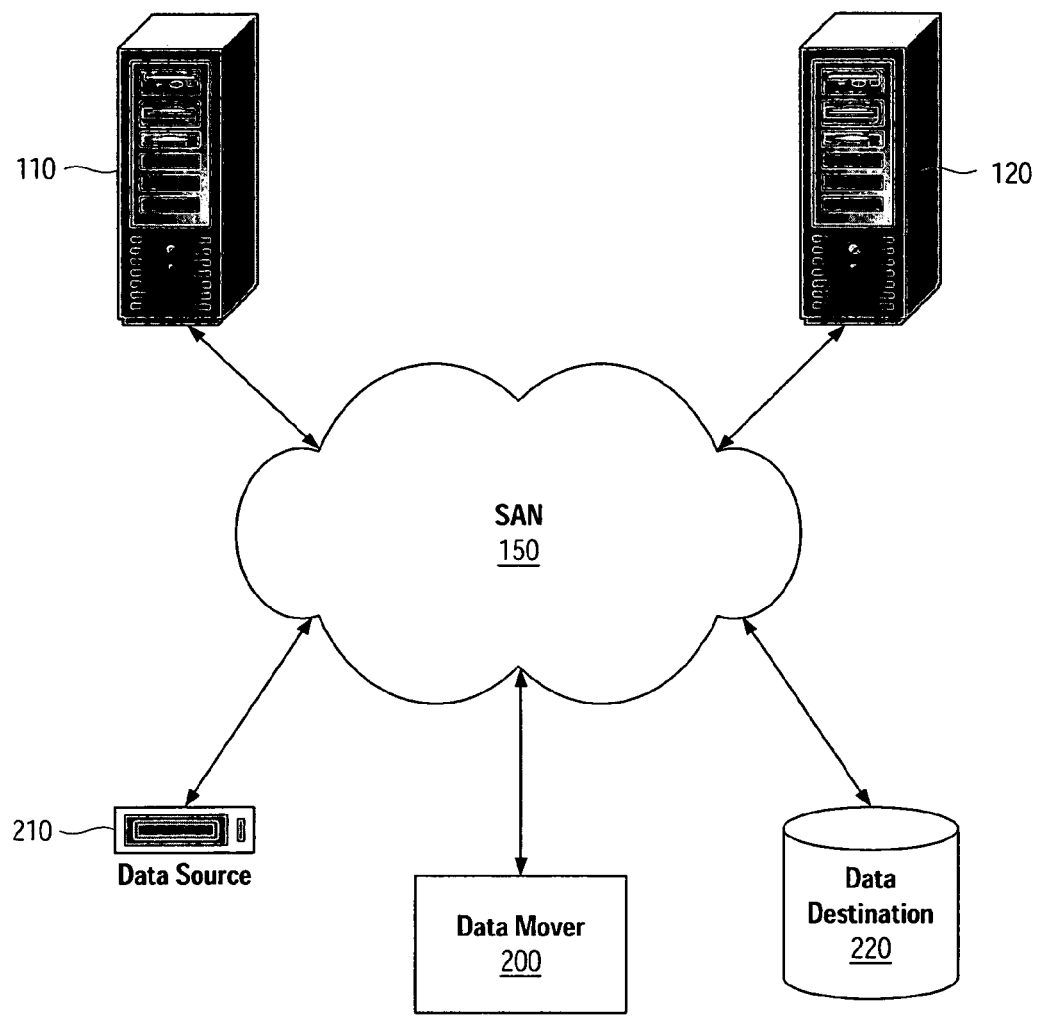
FIG. 2 illustrates the use of a data mover to move data from a source to a destination.
Figure 3A:
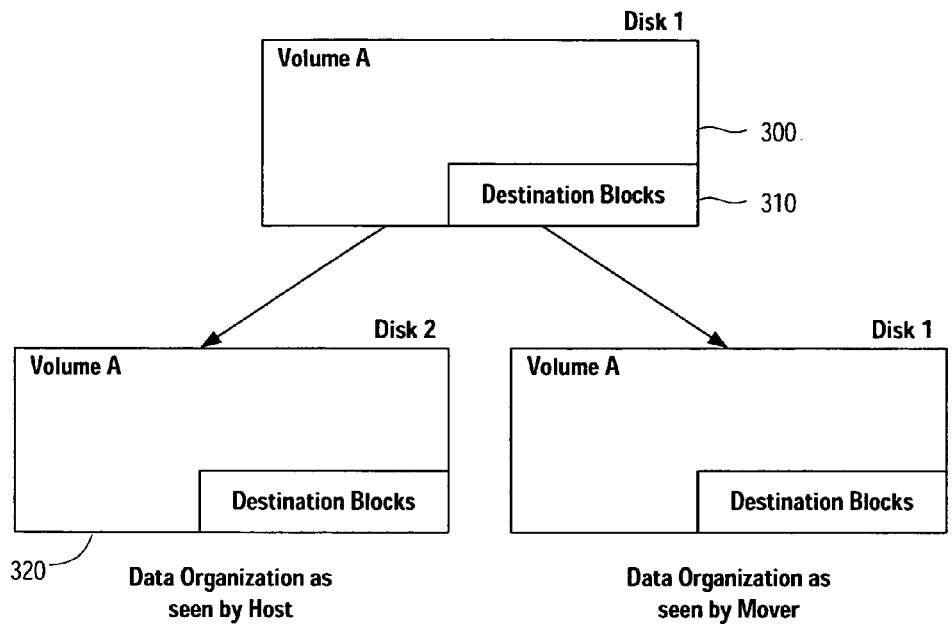
FIGS. 3A and 3B illustrate potential error conditions associated with extent based third-part copy operations.
Figure 3B:
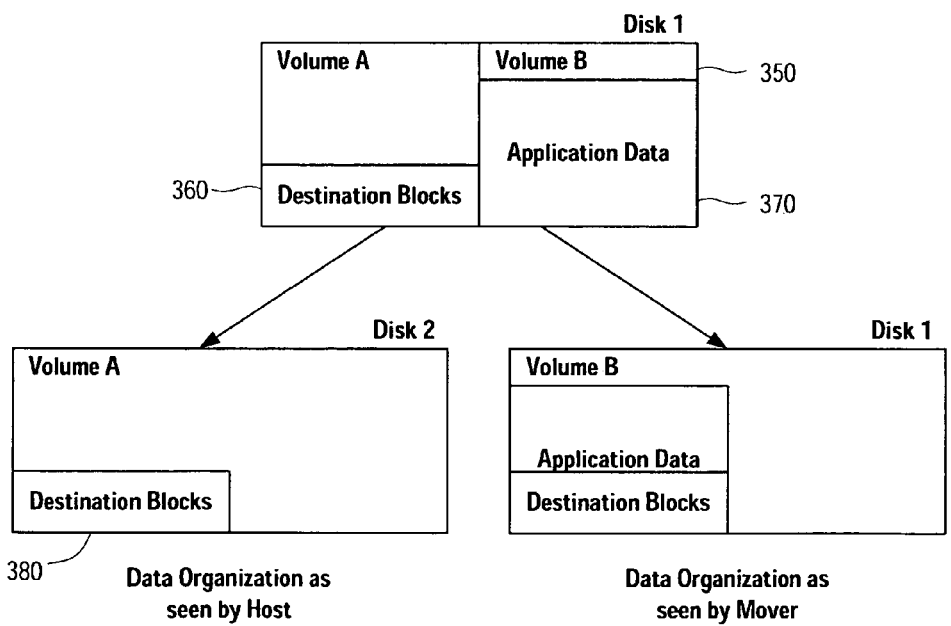
Figure 4:
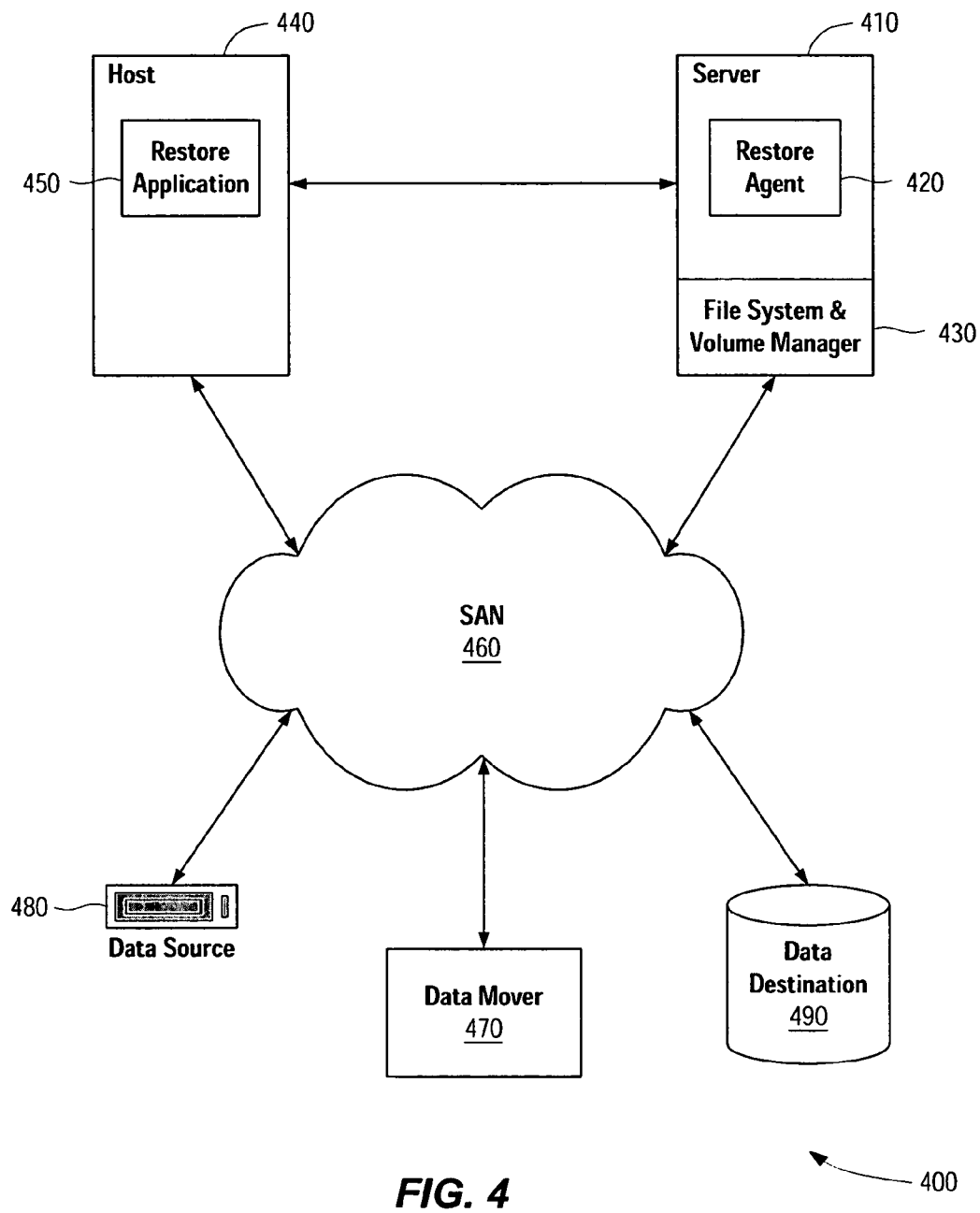
FIG. 4 is a simplified block diagram of a computer system using resource locks in the context of a third-party copy operation.

FIG. 4 is a simplified block diagram of a computer system using resource locks in the context of a third-party copy operation. In general, computer system 400 can be part of a larger computer system such as enterprise computer system 100 of FIG. 1. Server 410 includes file system and volume management software 430 executing on the server. File system software provides and/or supports additional (beyond typical operating system file system capabilities) file system features including for example: quick-recovery, journaling, backup without data lock out, and online file system resizing. Volume manager software enables physical resources configured in the computer system to be managed as logical devices or volumes. Software 430 can be part of the operating system executing on server 410, or it can comprise one or more specialized components such as the VERITAS Volume Manager™ and VERITAS File System™ products provided by VERITAS Software Corporation.

One or more of the file system, volume manager, operating system, or some other specialty software operating on Server 410 provides storage management and the storage resource lock mechanism used for safe data movement during third-party copy operations. Once a lock is placed on some portion of a storage resource (e.g., one or more blocks of storage in data destination 490), the locking mechanism prevents modification of the data in the locked portion of the storage resource. In general, data modification includes both writing to a portion of the storage resource thereby changing the data values stored therein and moving the data to another physical location as might be required during a hardware failure or a disk defragmentation operation. In some cases, the lock mechanism can prevent reads to the locked portion of the storage resource in order to prevent other software applications from obtaining data that might soon be changed by the third-party copy operation. Thus, the lock mechanism prevents data modification (and potentially data reads) initiated by some application or system component other than data mover 470.

Portions of a storage resource can, in general, be locked at whatever granularity is necessary or useful. For example, portions of a storage resource can be locked at the block level. In this case, the locking mechanism would receive, for example, an extent list describing the block or blocks that need to be locked. Storage resource portions can also be locked at other "physical" levels (e.g., sectors, tracks, etc.) or logical levels such as the file level, directory level, or volume level. Similarly, it may be necessary or desirable for the locking mechanism to lock more storage resources than need be locked to safely accomplish a third-party copy operation.

Server 410 utilizes storage resources including data source 480 and data destination 490. As illustrated in FIG. 4, data source 480 is a tape drive typically used for performing data backup and restore operations. Data destination 490 is typically one or more disk drives or disk drive arrays. Storage resources are coupled to server 410 through storage area network 460.

Host 440 executes a data transport application such as restore application 450. Although restore application 450 is illustrated, a variety of different data transport applications can be used including those supporting disk-to-disk transfers and any application designed to take advantage of third-party copy operations. Host 440 is illustrated as a separate computer system, e.g., another server or a client computer system coupled to server 410 via a network such as a LAN or WAN. Restore application 450 communicates with server 410's file system, volume manager, and/or operating system via restore agent 420. Alternately, restore application 450 can communicate directly with file system, volume manager, and/or operating system components executing on server 410. Additionally, restore application 450 need not be executing on a separate computer system such as host 440, but can instead execute as one or more processes on server 410.

Data mover 470 is a device for performing third-party copy operations as previously described. Data mover 470 can be a separate device as shown; part of a SAN switch, router, bridge, or another SAN network component (not shown); part of a storage resource such as data destination 490; or a process executing on a controller or processor associated with any of these devices. Although each of data source 480, data mover 470 and data destination 490 are all shown as coupled to server 410 and host 440 through SAN 480, it will be obvious to those having ordinary skill in the art that one, some, or all of the devices can be coupled directly to one or more of server 410 and host 440, and thus SAN 460 need not be utilized.

Figure 5A:
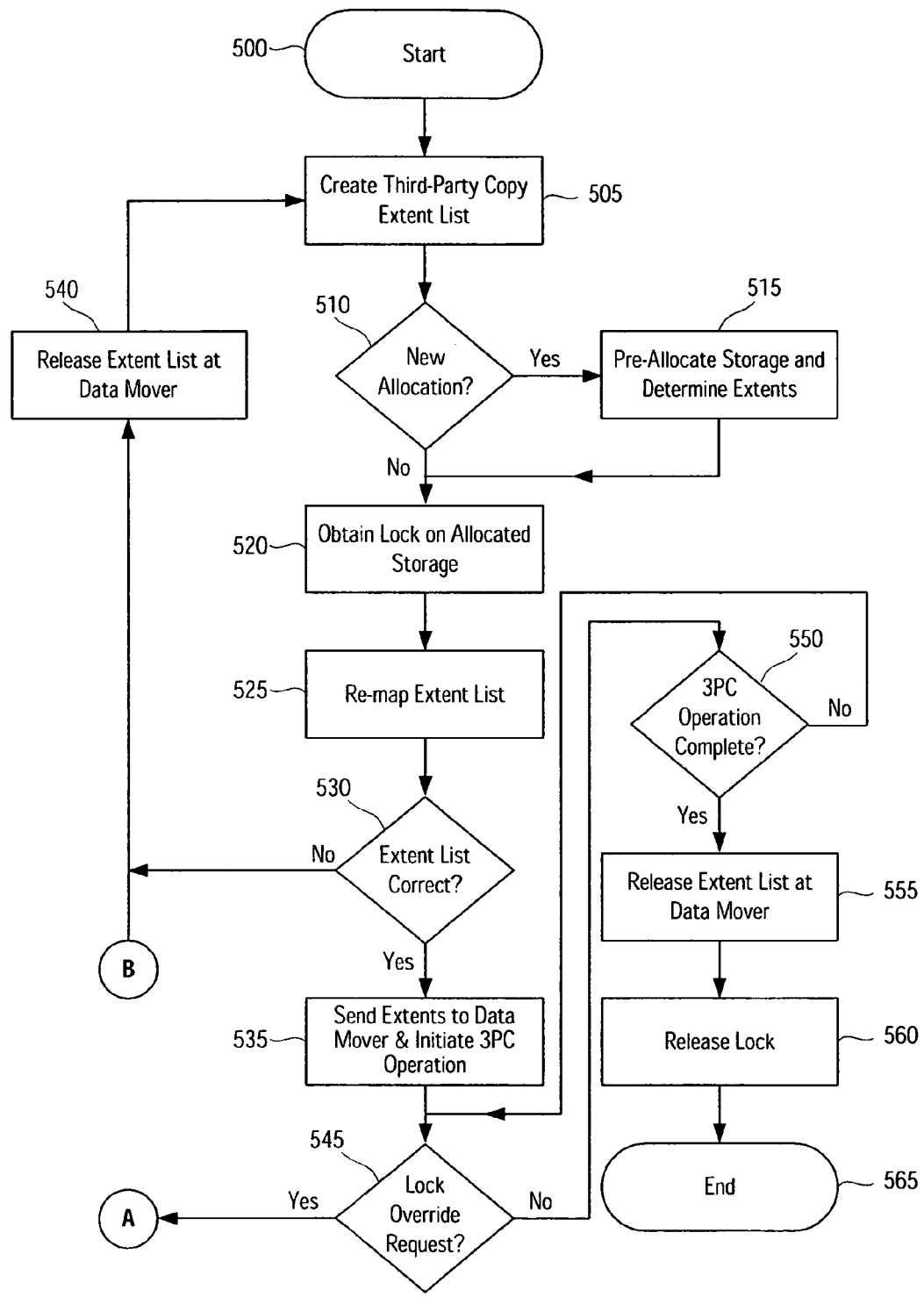
FIGS. 5A and 5B are flow charts illustrating techniques of the present invention.
Figure 5B:
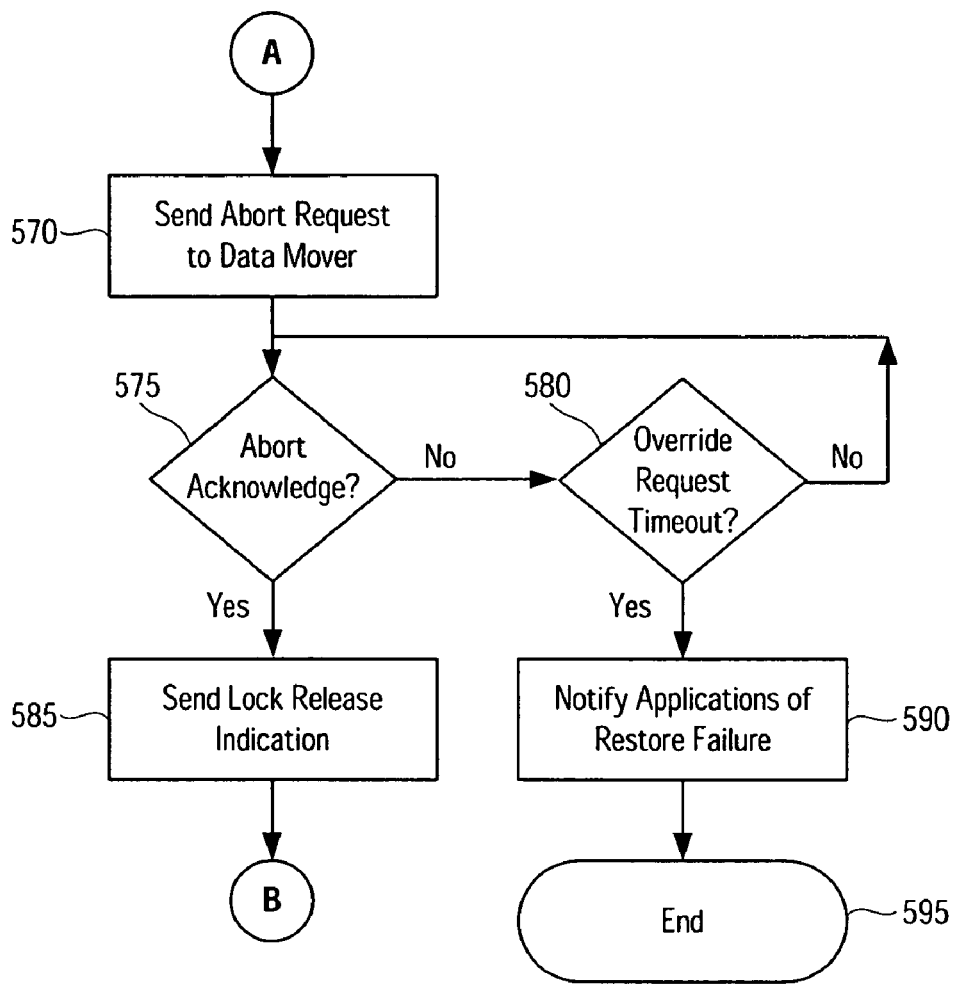

Operation of systems and methods for providing safe third-party copy data movement are illustrated in FIGS. 5A and 5B. Operation begins 500 when some data transport mechanism such as restore application 450 is invoked. In the examples described below, a data restore application will be utilized, but those having ordinary skill in the art will readily recognize that a variety of data transport applications can utilize both third-party copy operations and the protection schemes described in the present application. A third-party copy extent list is then created (e.g., a "source" extent list) as shown in step 505. For example, if a user of computer system 400 wishes to restore a data file from a tape in data source 480 to a disk drive in data destination 490, an extent list will be created describing the data to be restored. Next, a determination is made 510 as to whether a new allocation of a portion of the storage resource (in this case data destination 490) needs to occur. For example, if the restore operation will be restoring one file onto the space occupied by a previous version of the file and both files require the same space, then no new space allocation is necessary and operation proceeds directly to step 520. If a new space allocation is required, that allocation is performed at 515 where the storage is pre-allocated and the extents describing that storage portion are determined. Step 515 is typically performed by an operating system, a file system, a volume manager, or some combination thereof.

In either case a "destination" extent list is provided representing the portion of the storage resource to which the data will be restored. Next, a lock on the allocated storage is obtained at 520. The obtain lock step can include one or more sub-steps, but typically includes (1) a request by the restore application to the lock mechanism for a lock on the portion of the storage resource represented by the destination extent list, (2) placement of a lock on the portion of the storage resource and (3) a response from the lock mechanism indicating that a lock has been placed on the relevant portion of the storage resource. The request can include information about the severity of the lock, such as whether only data modification need be prevented or whether both modification and reading should be prevented. The response indicating that a lock has been granted can be a simple indication that the request has been granted, or it may also include one or more identifiers used to identify the locked session.

Steps 525 and 530 illustrate operations that can be performed to further insure that there has been no change to the destination extents between the time the lock is requested and the time the lock is placed on the portion of the storage resource. For example, if there is some modification to the data in the destination extent before the lock is in place but after the destination extent is determined, an error condition ("racing condition") can occur. Thus, the destination extent list is re-mapped in step 525 and compared with the locked portion of the storage resource in step 530 to determine if a change has occurred. If the extent list is correct, operation proceeds to 535. If the extent list is incorrect, it is released 540 and operation returns to 505 as shown (or alternately to 510). In an alternate embodiment, destination extent determination and locking are performed at the same time so that no such racing condition can occur.

In step 535, one or more extent lists, typically both the source and destination, extent lists, are sent to a data mover and the third-party copy operation is initiated. While the third-party copy operation is being performed, some other event might occur requiring modification of the locked storage resource portion. For example, a hardware failure might necessitate that the data be relocated to another device. Thus, certain processes such as those associated with the server operating system, file system, and or volume manager may request a lock override. In a typical implementation, only certain processes will have authority to request such a lock override. Moreover, the lock override request is typically made to the data transport application, e.g., restore application 450, using some override request identifier. If a valid lock override request is received, operation moves to 570 as described below. If there is no lock override request, a determination is made at 550 whether the third-party copy operation is complete. Such a determination can take a variety of forms. For example, restore application 450 can poll data mover 470 to determine of the third-party copy operation is complete. Alternately, restore application 450 can wait for an indication from data mover 470 that the operation is finished. If the third-party copy operation is not complete, the process loops back to 545 for lock override request determination. If the third-party copy operation is complete, the extent list is released at the data mover (step 555) and the lock is released (step 560). Lock release 560 can include one or more sub-steps such as (1) restore application requesting the lock release by, for example, providing the lock session identifier and a release request to the lock mechanism; (2) the lock mechanism releasing the lock; and (3) the lock mechanism providing some acknowledgement to restore application 450. The process then ends at 565.

If there was a lock override request, an abort request is sent to data mover 470 to terminate the third-party copy operation. Although typically sent by restore application 450, the abort request might be sent by some other entity such as the lock mechanism itself. If the abort request is acknowledged at 575, an indication is sent at step 585 that the lock release can be performed and operation proceeds to step 540. In one embodiment, the data mover 470 terminates the third-party copy operation and sends an abort acknowledgement to restore application 450. Restore application 450 in turn sends the lock release (including any appropriate identifier) to the lock mechanism. If no abort acknowledgement is received at 575, a determination is optionally made 580 whether the override request has timed-out. If the override request has not timed-out, operation returns to 575. If the override request has timed out and the requesting entity must take some action, all relevant applications are notified at 590 that a restore failure has occurred. The process then terminates 595.

Additionally, the re-mapping and comparisons steps 525 and 530 can in some cases be eliminated and in other cases replaced with comparable steps. For example, instead of re-mapping, the portion of the storage resource described by the destination extent list and/or the object or objects stored therein can have an associated configuration identifier. Upon allocation of the extents, the configuration identifier can be passed to the restore application. At later times when there is some concern that some change associated with the relevant extents has occurred, the current configuration identifier can be compared with the original configuration identifier to determine if in fact a change has occurred.

The flow charts of FIGS. 5A and 5B illustrate some of the many operational examples of a third-part copy data protection scheme. Those having ordinary skill in the art will readily recognize that certain steps illustrated in FIGS. 5A and 5B can be eliminated or taken in an alternate order. Moreover, the methods described in FIGS. 5A and 5B are typically implemented as one or more software programs for a computer system, that is encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Figure 6:
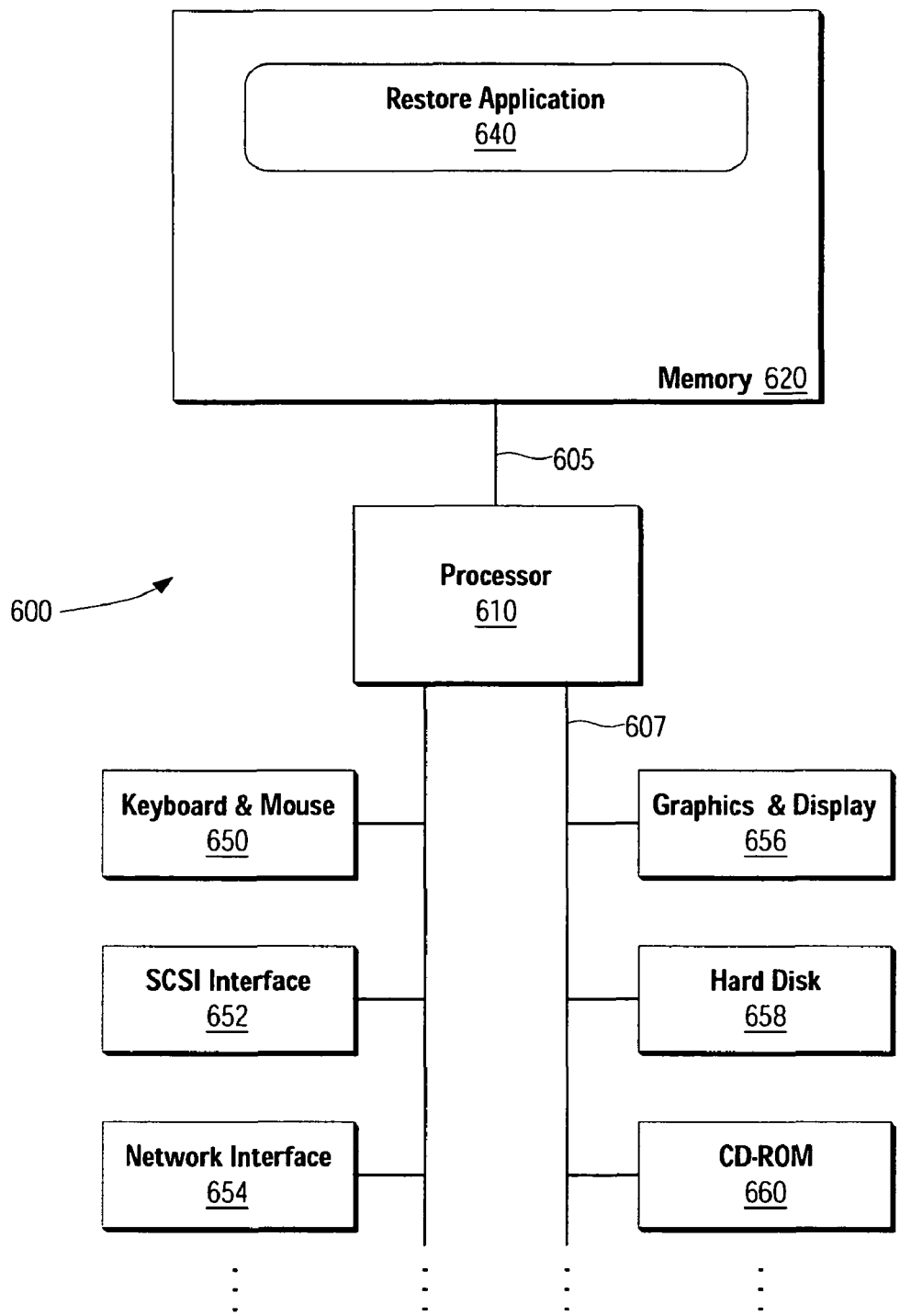
FIG. 6 is a simplified block diagram of a computer system for implementing the techniques of the present invention.

FIG. 6 illustrates a block diagram of a computer system 600 for implementing the techniques of the present invention. For example, computer system 600 can be an embodiment of one of the previously described servers, clients or hosts. Computer system 600 includes a processor 610 and a memory 620 coupled together by communications bus 605. Processor 610 can be a single processor or a number of individual processors working together. Memory 620 is typically random access memory (RAM), or some other dynamic storage device, and is capable of storing instructions to be executed by the processor, e.g., restore application 640. Memory 620 is also used for storing temporary variables or other intermediate information during the execution of instructions by the processor 610.

Those having ordinary skill in the art will readily recognize that the techniques and methods discussed below can be implemented in software using a variety of computer languages, including, for example, traditional computer languages such as assembly language, Pascal, and C; object oriented languages such as C++ and Java; and scripting languages such as Perl and Tcl/Tk. Additionally, software 640 can be provided to the computer system via a variety of computer readable media including electronic media (e.g., flash memory), magnetic storage media (e.g., hard disk 658, a floppy disk, etc.), optical storage media (e.g., CD-ROM 660), and communications media conveying signals encoding the instructions (e.g., via a network coupled to network interface 654).

Computer system 600 also includes devices such as keyboard & mouse 650, SCSI interface 652, network interface 654, graphics & display 656, hard disk 658, and CD-ROM 660, all of which are coupled to processor 610 by communications bus 607. It will be apparent to those having ordinary skill in the art that computer system 600 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications fall within the scope of the appended claims.

What is claimed is:

1. A method comprising:
    accessing an extent list describing data to be restored in response to a request to restore data to a storage resource from a second storage resource;
    requesting a lock on an allocated portion of the storage resource, wherein
        the allocated portion of the storage resource comprises a destination for the data described in the extent list, and
        the lock is requested in response to the request to restore the data to the storage resource from the second storage resource;
    determining whether the allocated portion of the storage resource has changed, prior to the lock being granted;
    initiating a third-party copy operation in response to determining that the lock has been granted, wherein the third-party copy operation moves the data from the second storage resource to the allocated portion of the storage resource; and
    indicating completion of the third-party copy operation when the third-party copy operation is complete.

2. The method of claim 1 wherein requesting a lock on an allocated portion of a storage resource further comprises:
    sending a lock request indication to a manager of the storage resource; and
    receiving a lock grant indication from the manager of the storage resource.

3. The method of claim 2 wherein the manager of the storage resource is at least one of an operating system, a file system, and a volume manager, the method further comprising:
    locking the allocated portion of the storage resource by the manager of the storage resource, the locking allowing only the third-party copy operation to modify the allocated portion of the storage resource.

4. The method of claim 1 wherein the initiating a third-party copy operation further comprises:
    sending the extent list a data mover; and
    requesting the data mover to perform the third-party copy operation using the extent list.

5. The method of claim 1 further comprising:
    receiving a lock override request; and
    requesting termination of the third-party copy operation.

6. The method of claim 5 further comprising:
    receiving an acknowledgement of termination of the third-party copy operation; and
    requesting release of the lock on the allocated portion of the storage resource.

7. The method of claim 5 further comprising:
    indicating that the third-party copy operation has failed when no acknowledgement of termination of the third-party copy operation has been received after a specified period of time.

8. The method of claim 1 further comprising:
    receiving an indication that the third-party copy operation is complete; and
    requesting release of the lock on the allocated portion of the storage resource.

9. The method of claim 1 further comprising:
    requesting allocation of the allocated portion of the storage resource; and
    receiving an extent list corresponding to the allocated portion of the storage resource, the extent list corresponding to the allocated portion of the storage resource including at least one extent.

10. The method of claim 1 further comprising:
    locking the allocated portion of the storage resource, wherein the locking is applied to at least one of a block, a sector, a track, a file, a directory, and a volume; and wherein the locking allows only the third-party copy operation to modify the allocated portion of the storage resource.

11. The method of claim 1 further comprising:
    determining, before the initiating and after receipt of a lock grant indication, whether a change to the allocated portion of the storage resource has occurred.

12. The method of claim 11 wherein the determining comprises:
comparing an extent list with information identifying the allocated portion of the storage resource.

13. The method of claim 1 wherein the allocated portion of the storage resource further comprises a configuration identifier, the method further comprising:
comparing the configuration identifier with a previous version of the configuration identifier to determine whether a change to the allocated portion of the storage resource has occurred.

14. The method of claim 1 wherein the storage resource and the second storage resource are coupled to each other through at least one of a local area network (LAN), a wide area network (WAN), and a storage area network (SAN).

15. The method of claim 1 wherein
a data mover performs the third-party copy operation, and
the data mover is coupled to the storage resource and the second storage resource by a network.

16. The method of claim 1, wherein the requesting the lock comprises specifying a severity of the lock.

17. The method of claim 1, further comprising:
detecting whether a race condition has occurred, wherein
the detecting comprises re-mapping a destination extent list, and
the destination extent list identifies at least one location of the allocated portion.

18. A computer readable medium comprising program instructions executable on a processor, the computer readable medium being at least one of an electronic storage medium, a magnetic storage medium, and an optical storage medium, wherein the program instructions are operable to implement each of:
accessing an extent list describing data to be restored in response to a request to restore data to a storage resource from a second storage resource;
requesting a lock on an allocated portion of the storage resource, wherein
the allocated portion of the storage resource comprises a destination for the data described in the extent list, and
the lock is requested in response to the request to restore the data to the storage resource from the second storage resource;
determining whether the allocated portion of the storage resource has changed, prior to the lock being granted;
initiating a third-party copy operation in response to determining that the lock has been granted, wherein the third-party copy operation moves the data from the second storage resource to the allocated portion of the storage resource; and
indicating completion of the third-party copy operation when the third-party copy operation is complete.

19. The computer readable medium of claim 18 wherein requesting a lock on an allocated portion of a storage resource further comprises program instructions operable to implement:
sending a lock request indication to a manager of the storage resource; and
receiving a lock grant indication from the manager of the storage resource.

20. The computer readable medium of claim 19 wherein the manager of the storage resource is at least one of an operating system, a file system, and a volume manager, the computer readable medium further comprising program instructions operable to implement:
locking the allocated portion of the storage resource by the manager of the storage resource, the locking allowing only the third-party copy operation to modify the allocated portion of the storage resource.

21. The computer readable medium of claim 18 wherein the initiating a third-party copy operation further comprises program instructions operable to implement:
sending the extent list to a data mover; and
requesting the data mover to perform the third-party copy operation using the extent list.

22. The computer readable medium of claim 18 further comprising program instructions operable to implement:
receiving a lock override request; and
requesting termination of the third-party copy operation.

23. The computer readable medium of claim 22 further comprising program instructions operable to implement:
receiving an acknowledgement of termination of the third-party copy operation; and
requesting release of the lock on the allocated portion of the storage resource.

24. The computer readable medium of claim 22 further comprising program instructions operable to implement:
indicating that the third-party copy operation has failed when no acknowledgement of termination of the third-party copy operation has been received after a specified period of time.

25. The computer readable medium of claim 18 further comprising program instructions operable to implement:
receiving an indication that the third-party copy operation is complete; and
requesting release of the lock on the allocated portion of the storage resource.

26. The computer readable medium of claim 18 further comprising program instructions operable to implement:
requesting allocation of the allocated portion of the storage resource; and
receiving an extent list corresponding to the allocated portion of the storage resource, the extent list corresponding to the allocated portion of the storage resource including at least one extent.

27. The computer readable medium of claim 18 further comprising program instructions operable to implement:
locking the allocated portion of the storage resource, wherein the locking is applied to at least one of a block, a sector, a track, a file, a directory, and a volume; and
wherein the locking allows only the third-party copy operation to modify the allocated portion of the storage resource.

28. The computer readable medium of claim 18 further comprising program instructions operable to implement:
determining, before the initiating and after receipt of a lock grant indication, whether a change to the allocated portion of the storage resource has occurred.

29. The computer readable medium of claim 18 wherein the allocated portion of the storage resource further comprises a configuration identifier, the computer readable medium further comprising program instructions operable to implement:
comparing the configuration identifier with a previous version of the configuration identifier to determine whether a change to the allocated portion of the storage resource has occurred.

30. The computer readable medium of claim 18 wherein the storage resource and the second storage resource are coupled to each other through at least one of a local area network (LAN), a wide area network (WAN), and a storage area network (SAN).

* * * * *